United States Patent [19]

van de Klundert et al.

[11] Patent Number: 4,709,314
[45] Date of Patent: Nov. 24, 1987

[54] SUPERCONDUCTING RECTIFIER FOR THE CONVERSION OF A RELATIVELY LOW ALTERNATING CURRENT INTO A RELATIVELY HIGH DIRECT CURRENT

[75] Inventors: Louis J. M. van de Klundert; Herman H. J. ten Kate; Jan Sikkenga, all of Enschede; Maarten Groenenboom, Enter; Jacques Lisser, Henhelo, all of Netherlands

[73] Assignee: Holec Systemen En Componenten B.V., Netherlands

[21] Appl. No.: 874,662

[22] Filed: Jun. 16, 1986

[30] Foreign Application Priority Data

Jun. 19, 1985 [NL] Netherlands ................... 8501762

[51] Int. Cl.$^4$ ............................................. H03K 3/38
[52] U.S. Cl. ...................................... 363/14; 363/125; 307/306
[58] Field of Search .................... 363/14, 125–127; 307/306

[56] References Cited

U.S. PATENT DOCUMENTS 3,356,924 12/1967 Buchhold ............................. 363/14

OTHER PUBLICATIONS

"Control System for a Superconducting Rectifier Using a Microcomputer", ten Kate et al., 9/81, IEEE Transactions on Magnetics, vol. Mag 17, No. 5, pp. 2063–2066.
"A Thermally Switched 9kA Superconducting Rectifier Fluxpump", ten Kate et al., 9/81, IEEE Transactions on Magnetics, vol-Mag 17, No. 5, pp. 2067–2070.
"High Current and High Power Superconducting Rectifiers", ten Kate et al., 5/81, Cryogenics, pp. 291–296. Cryognics, vol. 21, nr. 5, May 1981, pp. 267–277, IPC Business Press Ltd., Guildford, Surrey, GB; L. J. M. van de Klundert et al.: "On Fully Superconducting Rectifiers and Flux Pumps, A Review. Part 2: Commutation Modes, Characteristics and Switches".

Primary Examiner—Patrick R. Salce
Assistant Examiner—Emanuel Todd Voeltz
Attorney, Agent, or Firm—Watson Cole Grindle and Watson

[57] ABSTRACT

Superconducting rectifier for the conversion of a relatively low current from an alternating current supply source into a relatively high direct current, essentially consisting of a transformer, at least the secondary coil of which is constructed in semiconducting form, and superconducting switches for the passing of the alternating current induced in the secondary transformer coil through a load, in which the superconducting switches means consist of a commutating part and a blocking part which function independently of each other and are connected in series, and in which the increase in resistance (R) which the commutating part produces upon opening the switching means fulfils the condition $$R \leqq \left(\frac{dI}{dt}\right)_{max} \frac{L_{eff}}{I}$$

being appreciably lower than the increase in resistance which the blocking part produces upon opening the switches means.

12 Claims, 5 Drawing Figures

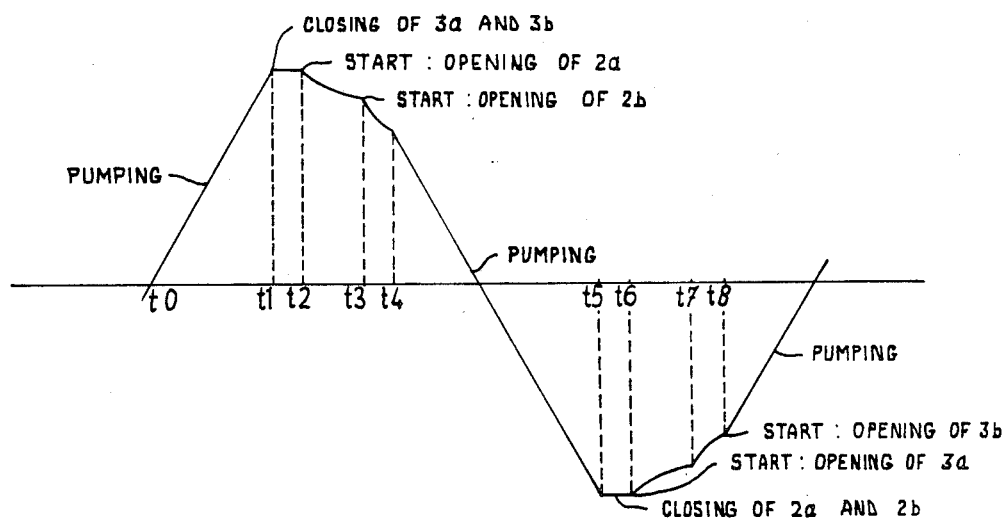

SUPERCONDUCTING RECTIFIER FOR THE CONVERSION OF A RELATIVELY LOW ALTERNATING CURRENT INTO A RELATIVELY HIGH DIRECT CURRENT

BACKGROUND OF THE INVENTION

1. Field of the Invention

The invention relates to a superconducting rectifier for the conversion of a relatively low current from an alternating current power supply into a relatively high direct current, essentially consisting of a transformer, at least the secondary coil of which is constructed in superconducting form, at least two superconducting switching means for the passing of the alternating current induced in the secondary transformer coil in one direction through a load, and electronic control and regulating switching means.

2. Related Art

A superconducting rectifier of this type, in particular for a flux pump, is described inter alia in two articles by L. J. M. van de Klundert and H. H. J. ten Kate entitled "On fully superconducting rectifiers and flux pumps'-'—a review—part I: "Realised methods for pumping flux" in Cryogenics, 21, 1981, pages 195-206 and part II: "Communications modes, characteristics and switches" in Cryogenics, 21, 1981 pages 267-277, in particular pages 275 and 276 for the switching means. A rectifier of this type is used for the conversion of the relatively low current from an alternating current supply source into a relatively high direct current with which, inter alia, N.M.R. (Nuclear Magnetic Resonance), also known as M.R.I. (Magnetic Resonance Imaging), systems can be fed. See the article by M. Wood entitled "Superconducting magnets by N.M.R. imaging and in vivo spectroscopy", which appeared in the proceedings of the ICEC 10, July/August 1984, Finland.

To make it possible to generate said high direct current, the secondary side of the superconducting rectifier may in principle comprise two electric circuits and in particular an electric circuit to make it possible to maintain the direct current generated and an electric current to make it possible to increase the direct current generated in steps. To this end each of the two electric circuits is opened or closed alternately by the respective superconducting switching means, which means that, for example, during operation as a superconducting rectifier, the current is continuously controlled to flow through one or the other of the electric circuits, i.e. to commutate. The manner in which said commutation takes place can be classified as resistive commutation and inductive commutation.

In the case of resistive commutation the resistance of the electric circuit in which the current is flowing at that instant is increased by means of the respective known superconducting switching means in a manner such that the current decreases to zero or nearly zero and is taken over by the other electric circuit which at that instant is in the superconducting state. Although resistive commutation is a relatively simple method of commutation, it is subject to a number of drawbacks which are an obstacle to a widespread application. Thus, the maximum current change per unit time, the so-called dI/dt value in the connected circuit, also forms the limit of the maximum current strength which can be achieved with resistive commutation. Said maximum dI/dt value determines in particular the limit above which the circuit will leave the superconducting state and depends in particular on the superconducting wire used. From the known design and material data it is possible to calculate how large said dI/dt value may be as a maximum in a particular circuit. However, this can also be determined by measurements in the respective circuit. The energy diSsipation compared with inductive commutation will also be relatively high because for each commutation a quantity of energy in the electric circuit in which the current decreases to zero is dissipated in the circuit.

The resistance in the electric circuit must further comply with two opposite requirements. During pumping, i.e. in the currentless state of the electric circuit, the resistance must be sufficiently high to obtain as low a dissipation as possible. For commutation, on the other hand, it is precisely a low resistance which is desired to keep the current change per unit time, or the dI/dt value, within the limits imposed during the commutation. The reason for this is that if the current change per unit time is too large, said dI/dt value will become so large that the conductors leave their superconducting state.

Said disadvantages of resistive commutation will not occur in inductive commutation because in this case, by means of a voltage change applied to the primary transformer side, a secondary current is induced in the electric circuit such that the latter causes the current flowing therein to decrease to zero while the associated time interval can at the same time be adjusted so that the maximum dI/dt value will not be exceeded.

In order to achieve this, the instantaneous current in the secondary circuit is now measured and the voltage change on the primary transformer side is dimensioned in time and magnitude in a manner such that the current induced on the secondary side as a result thereof completely or virtually completely corresponds to the measured instantaneous current. If the induced current is precisely equal to the instantaneous current, the commutation loss will be zero. In practice, however, this is not always readily achievable and some commutation loss will therefore occur. In the event of a faulty current measurement and/or feed back, even the maximum permissible dI/dt value may nevertheless again be exceeded in the extreme case, as a result of which the conductors leave their superconducting state.

A considerable disadvantage in the case of inductive commutation is therefore that means must be present to make it possible to determine the instantaneous current in the secondary circuit as accurately as possible and that means must be present to convert the magnitude of the measured current into a primary voltage change corresponding as precisely as possible thereto. In general, said means comprise complicated electronic circuits.

SUMMARY OF THE INVENTION

The object of the invention is therefore to provide a superconducting rectifier of the type mentioned in the introduction in which:
 the dI/dt value of the circuit is sufficiently low,
 no current measurement is necessary for the commutation,
 the commutation loss is low,
 during the opened, blocking state of the switching means a sufficiently high resistance is present, the switching frequency is equal to or higher than that of inductive commutation.

To this end the invention is characterized in that the superconducting switching means each consist of a commutating part and a blocking part which function independently of each other and are connected in series, the continuous or discontinuous increase in resistance which the commutating part produces in the opening state of the switching means fulfilling the condition $$R \leq \left(\frac{dI}{dt}\right)_{max} \frac{L_{eff}}{I}$$

and being appreciably lower than the increase in resistance which the blocking part produces in the opening state of the switching means, wherein:

R = the resistance of the commutating part,
dI/dt = the maximum permissible current change per unit time; to be determined by measurement and/or material and design data,
$L_{eff}$ = the effective inductance encountered in the circuit,
I = the instantaneous value of the charging current.

To achieve as high a switching frequency as possible, in the superconducting rectifier according to the invention, the time duration between the instant at which the increase in resistance produced by the commutating part is introduced into the circuit and the instant at which the increase in resistance produced by the blocking part is introduced into the circuit is a maximum of two to three times the time constant of the respective circuit.

To increase the efficiency of the superconducting rectifier according to the invention further, the primary side of the transformer is short-circuited during the commutation.

In an embodiment of the superconducting rectifier according to the invention, the commutating and blocking parts are connected in series, and the commutating part comprises a superconducting section and, connected in parallel therewith, a nonsuperconducting section which has a resistance value of $$R \leq \left(\frac{dI}{dt}\right)_{max} \frac{L_{eff}}{I}$$

BRIEF DESCRIPTION OF THE DRAWINGS

The invention will now be explained in more detail by reference to the drawing wherein:

FIG. 5 shows the primary current curve for a superconducting rectifier according to FIG. 4.

DETAILED DESCRIPTION

Figure 1:
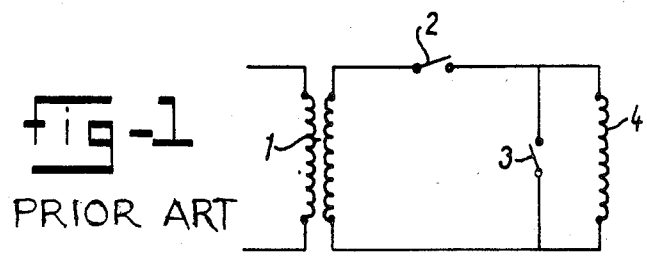
FIG. 1 is the diagrammatic representation of a known half-wave rectifier.

In FIG. 1, which shows the diagrammatic representation of a half-wave superconducting rectifier for, for example, a flux pump, the transformer is indicated by 1, the superconducting switching means by 2 and 3 respectively and a superconducting load by 4. If a voltage is now connected to the primary side of the transformer 1, this will result in an induced current I on the secondary side.

If the switch 2 is now closed and the switch 3 is opened, then the current I will flow through a superconducting circuit which is formed by the switch 2, the coil 4 and the secondary winding of the transformer 1. As soon as the primary current Ip has reached the maximum and requires to change direction, switch 3 is closed and switch 2 opened in sequence. The current I will now continue to flow only in the superconducting circuit formed by the switch 3 and the coil 4.

The time during which the current flows through the first-named or the last-named circuit can be defined as a pump cycle or the maintenance cycle, respectively, of the flux pump. In the pump cycle a certain value is therefore always added to the current I already generated and maintained. In FIG. 1 the pump cycle, apart from the time which is necessary for the total commutation process, will therefore correspond to half of the frequency of the alternating voltage connected to the primary side of the transformer 1.

Figure 2:
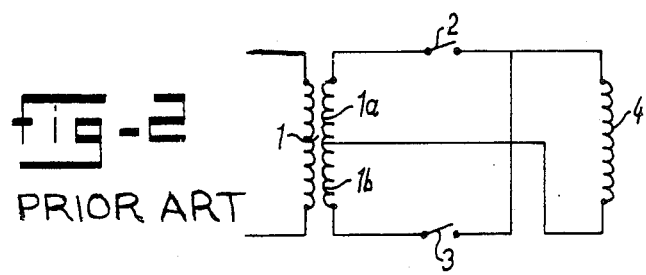
FIG. 2 is the diagrammatic representation of a known full-wave rectifier.

In order to increase the rate at which a certain current strength to be generated can be reached, use may be made of the full-wave superconducting rectifier as is shown diagrammatically in FIG. 2. Here again the current I will flow in turn through two superconducting circuits, in particular, formed by the secondary winding 1a, the switch 2 and the coil 4, or respectively the secondary winding 1b, the switch 3 and the coil 4. In fact, with the exception of the commutation period a pump cycle takes place during the entire cycle time of the alternating voltage connected to the primary side of the transformer 1, and the current already generated is thus continuously increased. Here, therefore, the maintenance cycle such as is half-wave rectification is missing.

If the commutation in FIG. 2 is resistive, when the current I decreases to zero, the switch which was opened, for example switch 3, will first be closed and in succession the closed switch 2 will be opened. All this means that in one circuit the resistance is reduced virtually to zero and in the other circuit through which the current flows, the resistance is sharply increased. The result is that the current in one circuit is turned off and pursues its path via the other circuit. As has been noted above, a relatively large commutation loss occurs in this method.

Figure 3:
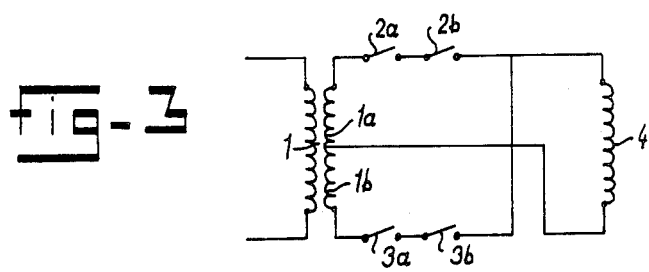
FIG. 3 is the diagrammatic representation of a full-wave superconducting rectifier according to the invention.

As can be seen from FIG. 3, according to the invention the switching means 2 or 3 respectively are composed of a commutating part 2a or 3a respectively having a low resistance and, connected in series therewith, a blocking part 2b or 3b respectively having a high resistance. If now, for example, the current is commutated from the circuit in which the switching means 2a, 2b are incorporated to the circuit in which the switching means 3a, 3b are incorporated, the opened switching means 3a, 3b will first be closed. Then the commutating part 2a of the switching means 2 is opened and the current, as a result of the increase in resistance, will be commutated from this circuit to the superconducting circuit in which the switching means 3a, 3b are closed and in which the resistance is therefore virtually zero. When the current in said circuit has fallen in this manner to a level at which, regardless of the magnitude of the resistance to be introduced and the rate at which this occurs, the maximum dI/dt value can no longer be exceeded, the blocking part 2b is opened so that as a consequence of the large increase in resistance, the residual current is commutated out of this circuit.

Because the various functions of the switching means are separated in the superconducting rectifier according to the invention, the opposite requirements mentioned in the introduction can always be fulfilled and, on the one hand, the maximum permitted dI/dt value will therefore never be exceeded and, on the other hand, the dissipation loss will be small, while at the same time the same pump frequency as usual remains possible. The superconducting rectifier according to the invention is thus simpler in construction, therefore more reliable, and has at the same time also the same power as the superconducting rectifiers common hitherto.

Figure 4:
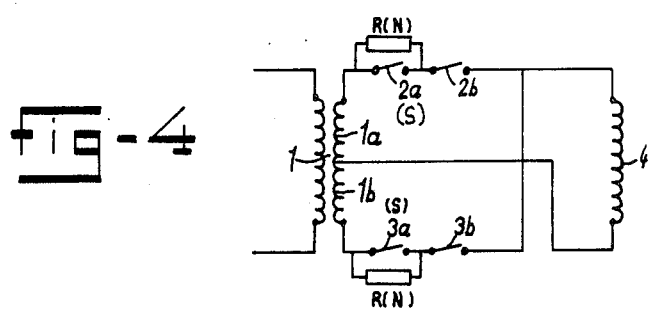
FIG. 4 is the diagrammatic representation of a modified embodiment of a superconducting rectifier according to the invention.

FIG. 4 shows diagrammatically how the commutating part of the superconducting switching means can be constructed in practice.

The commutating part 2a consists in this case of a superconducting part S and, connected in parallel therewith, a normal conductor N which has the specified resistance according to the invention, viz.

$$R \leq \left(\frac{dI}{dt}\right)_{max} \frac{L_{eff}}{I}$$

wherein:
R = the resistance of the commutating part 2a, i.e. the normal conductor N,
dI/dt = the maximum permissible current change per unit time; to be determined by measurement and/or material and design data,
$L_{eff}$ = the effective inductance encountered in the circuit,
I = the instantaneous value of the charging current.

The part S forms a component of the superconducting circuit and is dimensioned, for example by giving the length l and the diameter d a particular value, in a manner such that the resistance of S in the normal, non superconducting state is much larger than that of N.

In the superconducting state of S, i.e. in the closed state of the superconducting switching means, the resistance of S is virtually zero and the current I will flow in its entirety through the section S. During the commutation, S is taken out of the superconducting state, as a result of which the resistance of S becomes much greater than that of N, with the result that the current I will now start to flow virtually completely through the normal conductor N. In said situation the resistance in the circuit is therefore virtually completely determined by the resistance R of the normal conductor N.

For the purpose of clarification FIG. 5 shows the curve of the primary current in a superconducting rectifier according to the invention used in a flux pump having the circuit as shown in FIG. 4. In this case a linearly increasing and decreasing current curve cyclically passing through zero has been assumed. Of course, various current forms are possible and the current curve of FIG. 5 is only given by way of example.

In FIG. 5 the time is plotted on the horizontal axis. Let us suppose that at the instant in time $t_0$ the switching means 2a, 2b in FIG. 3 are closed. At the instant in time $t_1$, i.e. at the end of the pump stroke, the switching means 3a, 3b will first be closed so that the other circuit is made ready to be able to take over the current I.

To be certain that the switching means 3a, 3b will be closed, the opening of the switching means 2a, 2b is delayed until the instant in time $t_2$. At time $t_2$ the commutating part 2a is opened and the resistance R of said commutating part 2a is therefore introduced into the circuit. When at the instant in time $t_3$ the current I has decreased sufficiently, the resistance of the blocking part 2b is introduced into the circuit. Only when, at the instant in time $t_4$, the full resistance of the blocking part 2b has been incorporated in the circuit, will it be possible for pumping to start for the circuit in which the switching means 3a, 3b are incorporated. At the end of the pump stroke, i.e. at the instant in time $t_5$, the same cycle starts for the other circuit.

To reduce the energy dissipation, in the superconducting rectifier according to the invention the voltage on the primary side of the transformer is kept equal to zero from the instant the increase in resistance produced by the commutating part is introduced into the circuit until the instant when the increase in resistance produced by the blocking part is fully incorporated in the circuit. For this purpose, the primary side of the transformer may be short-circuited in FIG. 5 from the instant in time $t_2$ to $t_4$ and $t_6$ to $t_8$.

This short circuiting globally reduces the effective induction from $L_{sec}$ to $L_{eff} \approx L_{sec}(1-k^2)$.

Here k is the coupling coefficient of the transformer which is defined by:

$$k = \frac{M}{\sqrt{L_{sec}L_p}}$$

wherein:
M represents the mutual inductance of the transformer,
$L_{sec}$ represents the secondary inductance of the transformer,
$L_p$ represents the primary inductance of the transformer, and where it is also the case that: $0 \leq k \leq 1$.

The invention is obviously not limited to the rectifying circuits shown and discussed and can, for example, also be used in a full-wave rectifier bridge according to FIG. 18 or the rectifier circuit according to FIG. 19 of part I of the paper mentioned on page 1.

We claim:
1. Superconducting rectifier for the conversion of a relatively low current from an alternating current supply source into a relatively high direct current for supply to a load, comprising:
a transformer including a primary coil for receiving said relatively low current and first and second superconducting secondary coils having a common tap for alternately conducting said relatively high direct current in one direction to said load;
first superconducting switching means being connected between said first secondary coil and said load and second superconducting switching means being connected between said second secondary coil and said load, said first and second superconducting switching means being adapted to be switched independently of one another and each including serially-connected commutating switching portions and blocking switching portions adapted to be closed and opened in dependence on one another to alternately supply the relatively high direct current to said load from said first and second superconducting secondary coils;

the open condition of the commutating portion of said first and second superconducting switching means each producing a commutating resistance fulfilling the following condition:

$$R \leq (dI/dt)_{max} \times L_{eff}/I;$$

said commutating resistance being substantially lower than the blocking resistance of each of said first and second blocking portions of said first and second superconducting switching means during the open condition of the respective blocking portions, wherein R = the resistance of the commutating portion of each of said first and second superconducting switching means during the open condition thereof;

dI/dt = the maximum permissable current change per unit time;

$L_{eff}$ = the effective inductance of the superconducting rectifier; and

I = the instantaneous value of the secondary rectifier current.

2. Superconducting rectifier according to claim 1, wherein said commutating portions each include a superconducting part and, connected in parallel thereto, a normally conducting part having said resistance R $$[R \leq (dI/dt)_{max} \times L_{eff}/I]$$

and wherein the superconducting part in the closed condition of each of said first and second superconducting switching means is superconducting and in the open condition of the superconducting switching means has a resistance which is appreciably larger than that of said normal conductor connected in parallel thereto and having said resistance R.

3. Superconducting rectifier according to claim 1, wherein the increase in resistance of the commutating portion in said first and second superconducting switching means during switching from a closed to an open condition is substantially continuous and the associated increase in resistance fulfils the stated condition:

$$R \leq (dI/dt)_{max} \times L_{eff}/I$$

4. Superconducting rectifier according to claim 1, wherein the total resistance of said first and second superconducting switching means fulfils the stated condition:

$$R \leq (dI/dt)_{max} \times L_{eff}/I$$

during switching of each of said commutating portions from a closed to an open condition.

5. Superconducting rectifer according to claim 1, wherein a time elapses of two to three times the time constant of the rectifier circuit between the open condition of said commutating portion and the closed condition of the associated blocking portion.

6. Superconducting rectifier according to claim 1, wherein the primary voltage of said transformer is kept equal to zero during switching of each of said commutating portions to an open condition and the associated blocking portion to a closed position in each of said first and second superconducting switching means and where the effective inductance $L_{eff}$ of said transformer is reduced to approximately $L_{sec}(1-k^2)$ where $$K = M/(L_{sec}L_P)^{\frac{1}{2}}$$

wherein:

M represents the mutual inductance of the transformer;

$L_{sec}$ represents the secondary inductance of the transformer;

$L_P$ represents the primary inductance of the transformer; and where $0 \leq k \leq 1$.

7. Superconducting rectifier according to claim 2, wherein a time elapses of two to three times the time constant of the rectifier circuit between the open condition of said commutating portion and the closed condition of the associated blocking portion.

8. Superconducting rectifier according to claim 3, wherein a time elapses of two to three times the time constant of the rectifier circuit between the open condition of said commutating portion and the closed condition of the associated blocking portion.

9. Superconducting rectifier according to claim 4, wherein a time elapses of two to three times the time constant of the rectifier circuit between the open condition of said commutating portion and the closed condition of the associated blocking portion.

10. Superconducting rectifier according to claim 2, wherein the primary voltage of said transformer is kept equal to zero during switching of each of said commutating portions to an open condition and the associated blocking portion to a closed position in each of said first and second superconducting switching means and where the effective inductance $L_{eff}$ of said transformer is reduced to approximately $L_{sec}(1-k^2)$ where:

$$K = M/(L_{sec}L_P)^{\frac{1}{2}}$$

wherein:

M represents the mutual inductance of the transformer;

$L_{sec}$ represents the secondary inductance of the transformer;

$L_P$ represents the primary inductance of the transformer; and where $0 \leq k \leq 1$.

11. Superconducting rectifier according to claim 3, wherein the primary voltage of said transformer is kept equal to zero during switching of each of said commutating portions to an open condition and the associated blocking portion to a closed position in each of said first and second superconducting switching means and where the effective inductance $L_{eff}$ of said transformer is reduced to approximately $L_{sec}(1-k^2)$ where:

$$K = M/(L_{sec}L_P)^{\frac{1}{2}}$$

wherein:

M represents the mutual inductance of the transformer;

$L_{sec}$ represents the secondary inductance of the transformer;

$L_P$ represents the primary inductance of the transformer; and where $0 \leq k \leq 1$.

12. Superconducting rectifier according to claim 4, wherein the primary voltage of said transformer is kept equal to zero during switching of each of said commutating portions to an open condition and the associated blocking portion to a closed position in each of said first and second superconducting switching means and where the effective inductance $L_{eff}$ of said transformer is reduced to approximately $L_{sec}(1-k^2)$ where:

$$K = M/(L_{sec}L_P)^{\frac{1}{2}}$$

wherein:
  M represents the mutual inductance of the transformer;
  $L_{sec}$ represents the secondary inductance of the transformer;
  $L_P$ represents the primary inductance of the transformer; and
  where $0 \leq k \leq 1$.

* * * * *